United States Patent Office 3,468,904
Patented Sept. 23, 1969

3,468,904
PRODUCTION OF LIGHT-COLORED FATTY-DERIVED AMINO-CONTAINING COMPOUNDS
Theodore H. Kritchevsky, Chicago, Ill., assignor to Hodag Chemical Corporation, Skokie, Ill., a corporation of Illinois
No Drawing. Filed Oct. 24, 1965, Ser. No. 505,044
Int. Cl. C07d 49/34; C07c 103/00, 103/02
U.S. Cl. 260—309.6                 8 Claims

ABSTRACT OF THE DISCLOSURE

The method of producing light colored fat acid derived amino-containing compounds, exemplified by amino-amides and amino-imidazolines of lauric acid, myristic acid and oleic acid, and which also possess enhanced color stability on storage, wherein the reaction to produce said amino-containing compounds is carried out in the presence of a small proportion of borohydrides or hydrides such as those of the alkali metals, for instance, sodium borohydride or sodium hydride.

---

This invention is directed to the production of light colored fatty-derived amino-containing compounds exemplified especially by imidazoline (or glyoxalidine) compositions having a high content of said imidazolines (or glyoxalidines).

Imidazolines have long been known, being utilized for a variety of surfactant purposes such as the treatment of textiles, as emulsifying agents, wetting agents, etc. They are conventionally produced by condensing, under conditions of heating and stirring, a fat-acid, in the form of a long chain monocarboxylic or fatty acid (or a source thereof such as amides or esters of said acids) with an hydroxyalkyl alkylene polyamine, such as amino-ethylethanolamine. The mol ratio of the fat acid to the polyamine is somewhat variable but generally falls within the range of 1 mol of the fat acid to 1 to about 2 mols of the polyamine. The temperature at which the condensation reaction is carried out, generally speaking, is in excess of 100° C., usually in the range of about 120° C. to about 250 or 300° C., and the reaction time is several hours, usually within the range of about 4 to 12 hours, depending upon the particular reactants employed, the particular condensation temperature employed, and the extent to which the imidazoline-forming reaction is carried out. The reaction temperature may be reduced, generally speaking, by operating under pressure conditions lower than atmospheric pressure. Illustrative of such procedures for the production of imidazolines are U.S. Patents Nos. 2,267,965; 2,574,-537 and 3,138,473. Generally speaking, the condensation temperature or temperature of heating and the duration of the heating are so correlated as to cause splitting out of water in excess of 1.5 mols for each mol of free monocarboxylic or fat acid and in excess of 0.5 mol for each mol of combined monocarboxylic or fat acid involved.

When the condensation reaction is carried out sufficiently to produce condensation or reaction products which are high in imidazoline content, say, about 70% to about 90%, the final products are generally characterized by dark or deep colors which are objectionable for various uses to which the imidazolines are put, the higher the concentration of imidazoline the darker the color generally. Hence, in those instances in which light colored imidazolines are desired, the condensation reaction has generally been carried out to a limited extent, ordinarily to produce condensation products in which the imidazoline content does not exceed about 50% or slightly higher. Alternatively, to produce light colored imidazolines, it has been suggested (U.S. Patent No. 2,267,965) to effect purification by vacuum distillation, but this procedure is costly and objectionable.

In accordance with the present invention, condensation products of fat acids and hydroxyalkyl alkylene polyamines can be produced, under normal pressures and at elevated temperatures, in which the imidazoline content is of the order of 70 to 90% while at the same time the color of the condensation products is very light. Furthermore, the resulting imidazoline products are characterized by enhanced color stability so that they do not darken on standing or under usual storage conditions. Such imidazoline products thus find ready use in environments where light color is an important desideratum, and at the same time the said products have the very desirable high concentration of the desired imidazoline. The foregoing results are obtained by carrying out the condensation reaction, at elevated temperatures generally in the range of about 120° C. to about 300° C. and usually in the range of about 190° C. to 230° C., in the presence of small proportions of certain borohydrides.

The borohydrides which are useful in the practice of the present invention fall into the groups of alkali metal borohydrides, alkaline earth metal borohydrides, quaternary ammonium borohydrides and amine borohydrides, illustrative examples of which are borohydrides of sodium, potassium, lithium, calcium, barium, magnesium, strontium and lithium-aluminum; tetramethylammonium borohydride, tetraethylammonium borohydride, tetrapropylammonium borohydride, and tetraisopropylammonium borohydride; triethylamine borohydride, tri-isopropylamine borohydride, tri-butylamine borohydride and tri-isobutylamine borohydride. Also of utility, but generally to a lesser extent, and more difficult to handle, are alkali metal and alkaline earth metal and other metal hydrides such as sodium hydride, potassium hydride, lithium hydride, calcium hydride, titanium hydride and zirconium hydride. Of especial utility is sodium borohydride. The borohydrides, or hydrides as the case may be, need not be utilized in more than very small quantities, generally of the order of 0.005 to 0.1%, and especially from 0.01 to 0.05%, by weight of the reactants, employed in the production of the imidazolines, or other fatty-derived amino-containing compounds as discussed hereafter.

It is important to the achievement of the improvements of the present invention that the reaction to produce the imidazolines, or other fatty-derived amino-containing compounds, be carried out in the presence of the borohydrides, or hydrides, as the case may be. Thus, if the imidazolines, for instance, are produced by heretofore known conventional procedures, so as to possess a dark color, that dark color cannot be removed by subsequent heating in the presence of the borohydrides or hydrides.

While the invention is particularly important, as described above, in connection with the production of light colored condensation products in which the imidazoline content is of the order of at least 70% and especially upwards of 85%, by weight, the invention has broader applicability to the production of light colored fatty-derived amino-containing compounds having a variety of structures, including amino-amides, that is, condensation products of fat acids (or their amides or esters) with hydroxyalkyl polyamines or hydroxyalkyl alkylene polyamines in which the reaction is not carried out to an extent sufficient to effect ring closure or any substantial ring closure, as in the case of the production of the imidazolines, but where dark colored reaction products naturally result from carrying out the condensation reaction. It is also applicable to the production of oxazolines, by condensing fat acids (or sources thereof such as the amides or esters thereof) with, for instance, N-beta hydroxy lower alkyl alkanolamines such as N-beta hydroxyethyl ethanolamine under ring closure elevated temperatures; as well as to the production of lower alkyl tetrahydropyrimidines wherein a fat acid is reacted with a 1,3-diamine, as shown, for instance, in U.S. Patent No. 2,658,895.

The term "fat acids" is used herein in the same sense in which it is employed in U.S. Patent No. 3,138,473, namely, to include saturated, ethylenically unsaturated and acetylenically unsaturated naturally occuring and synthetic monobasic aliphatic acids containing from 8 to 24 carbon atoms and encompasses such fat acids as are disclosed in said patent. Particularly preferred are those fat acids which contain from 12 to 18 carbon atoms, notably lauric acid, myristic acid, palmitic acid, oleic acid, stearic acid and commercial mixtures of such acids as are derived from animal, fish and vegetable oils and fats such as coconut oil, cottonseed oil, corn oil, tallow, babassu oil, palm kernel nut oil, soya oil, linseed oil, castor oil, olive oil, whale oil, and also such monocarboxylic acid mixtures as are present in tall oil or refined tall oil and the like. In place of the monocarboxylic or fatty acids, the amides or esters thereof can be employed, including the glyceride esters such as the foregoing oils and fats, as well as the monohydric alcohol esters such as the methyl esters of the foregoing acids.

In place of the straight fat acids, epoxidized fat acids and polymeric fat acids can be employed in the production of the light colored fatty-derived amino-containing compounds pursuant to the present invention. Such fat acids are also well known to the art and are disclosed, for instance, in the aforementioned U.S. Patent No. 3,138,473.

The polyamines, notably the alkylene polyamines and the hydroxyalkyl polyamines, which are used to produce the imidazolines and other fat acid derived amino-containing compounds, can likewise be selected from large numbers of known examples thereof, including such hydroxy lower alkyl lower alkylene polyamines having at least one primary amino group, as ethylenediamine, diethylenetriamine, triethylenetetraamine; aminoethylethanolamine or beta-hydroxyethyl ethylenediamine, hydroxyethyl diethylenetriamine, hydroxyethyl diethylenetriamine, hydroxyethyl triethylenetetraamine and other hydroxyalkyl alkylene polyamines of the 1,2 series, that is, wherein at least one amino group and one imino group are attached to adjacent carbon atoms, as disclosed, for instance, in U.S. Patent No. 2,267,965; and other hydroxyalkyl polyamines such as are disclosed, for example, in U.S. Patents Nos. 2,340,881; 2,391,830 and 2,574,537.

The following examples are illustrative of the practice of the invention. Others can readily be evolved in the light of the guiding principles and teachings disclosed herein with respect to the production of numerous other light colored and color stable fat acid derived amino-containing compounds. The examples, therefore, are not to be construed in any way as limitative of the scope of the invention. All parts listed are by weight.

EXAMPLE 1

1880 parts of commercial refined tall oil fatty acids, 1690 parts of aminoethylethanolamine (the mol ratio of the latter to the former being about 2.5 to 1) and 0.1 part sodium borohydride (about 0.03% by weight of the total charge) are mixed together in a reaction flask and the reaction mixture is heated, under stirring in an inert gas (nitrogen) atmosphere and at a reduced pressure of 100–150 mm. Hg, at a temperature in the range of about 120–150° C. for about 4 to 5 hours. The temperature is then increased to about 210–220° C. for about 5 hours and then the reaction mixture is rapidly cooled to about 60° C. A clear, light colored liquid having an imidazoline content of about 92–94% and a Gardner color value of about 11.5 is obtained.

EXAMPLE 2

1 mol of oleic acid, 2 mols of N-beta-hydroxypropyl propylene diamine, and 0.03% of sodium borohydride (by weight of the total charge) are heated, under stirring in an inert gas (nitrogen) atmosphere and at a reduced pressure of about 150 mm. Hg, at a temperature of about 150° C. for about 4 hours and then the temperature is increased to about 200–215° C. and heating is continued for an additional approximately 4 hours. A clear almost colorless liquid is obtained with a content of in excess of 85% of a hydroxyalkyl glyoxalidine.

EXAMPLE 3

1 mol of a commercial lauric acid (containing about 90% lauric acid), 1.1 mols of aminoethylethanolamine, and 0.03% of tetramethylammonium borohydride (by weight of the total charge) are reacted under the conditions specified in Example 1. A very light colored solid is obtained in which the imidazoline content is approximately 90%.

The reaction products will, generally, be used, as such, without the necessity for any purification, although, if desired, they may be further purified by vacuum distillation to remove any unreacted amine or the like which may be present.

What I claim as new and desire to protect by Letters Patent of the United States is:

1. In the method of producing fat acid derived amino-containing compounds selected from the group consisting of the aminoamides and amino-imidazolines of fat acids, the aminoamides and amino-imidazolines of epoxidized fat acids, and the aminoamides and amino-imidazolines of polymeric fat acids, wherein a fat acid selected from the group consisting of fat acids, epoxidized fat acids, and polymeric fat acids is reacted at a reaction temperature in excess of 100° C. with hydroxy lower alkyl lower alkylene polyamines, the improvement which comprises carrying out said reaction in the presence of about 0.005% to about 0.1% of a borohydride selected from the group consisting of alkali metal borohydrides, alkaline earth metal borohydrides, and tetra-lower alkyl ammonium borohydrides whereby to produce said amino-containing compounds with a lighter color than would result from carrying out said reaction in the absence of said borohydride.

2. In the method of producing fat acid derived amino-containing compounds selected from the group consisting of the aminoamides and amino-imidazolines of fat acids, the aminoamides and amino-imidazolines of epoxidized fat acids, and the aminoamides and amino-imidazolines of polymeric fat acids, wherein a fat acid selected from the group consisting of fat acids, epoxidized fat acids, and polymeric fat acids is reacted with an hydroxy lower alkyl lower alkylene polyamine of the 1,2 series in a mol ratio of 1 of said acid to about 1 to 2 of said polyamine, at a reaction temperature in excess of 100° C., the improvement which comprises carrying out said reaction in the presence of about 0.005% to about 0.1% of a borohydride selected from the group consisting of alkali metal borohydrides, alkaline earth metal borohydrides, and tetra-lower alkyl ammonium borohydrides, whereby to produce said amino-containing compounds with a lighter color than would result from carrying out said reaction in the absence of said borohydride.

3. The method of claim 2, wherein the borohydride is sodium borohydride.

4. In the method of producing substituted glyoxalidines wherein a mixture, containing (a) a hydroxy lower alkyl lower alkylene polyamine of the 1,2 series and (b) at least one member of the group consisting of fat acids containing from 8 to 24 carbon atoms, their amides and their esters, is heated at temperatures between about 120° and about 300° C. while water is removed during said heating and wherein the temperature and duration of said heating are so correlated as to cause the splitting out of water in excess of 1.5 mols for each mol of free fat acid and in excess of 0.5 mol for each mol of combined fat acid involved, the improvement which consists in carrying out said heating step in the presence of about 0.005% to about 0.1% of a borohydride selected from the group consisting of alkali metal borohydrides, alkaline earth metal borohydrides, and tetra-lower alkyl ammonium borohydrides, whereby to produce said substituted glyoxalidines with a lighter color than would result from carrying out said reaction in the absence of said borohydride.

5. The method of claim 4, wherein the borohydride is sodium borohydride.

6. In the method of producing imidazoline products having a content of at least 70%, by weight, of imidazoline, wherein a $C_8$–$C_{24}$ fat acid, or its amides or esters, is reacted with a hydroxy lower alkyl lower alkylene polyamine of the 1,2 series in a mol ratio of 1 of said acid to about 1 to 2 of said polyamine, at reduced pressure and at a reaction temperature in the range of 100 to 250° C., the improvement which consists in carrying out said reaction in the presence of about 0.005% to about 0.1% of a borohydride selected from the group consisting of alkali metal borohydrides, alkaline earth metal borohydrides, and tetra-lower alkyl ammonium borohydrides, whereby to produce said imidazoline products with a lighter color than would result from carrying out said reaction in the absence of said borohydride.

7. The method of claim 6, wherein the polyamine is aminoethylethanolamine and the borohydride is sodium borohydride.

8. In the method of producing imidazoline products having a content of at least 70%, by weight, of imidazoline, wherein tall oil fatty acids are reacted with aminoethylethanolamine in a mol ratio of 1 of said fatty acids to about 1.1 to about 2.5 of said aminoethylethanolamine at an elevated reaction temperature, the improvement which consists in carrying out said reaction in the presence of about 0.01% to about 0.05% by weight of said reactants, of sodium borohydride, whereby to produce said imidazoline products with a lighter color than would result from carrying out said reaction in the absence of the sodium borohydride.

References Cited

UNITED STATES PATENTS

| | | | |
|---|---|---|---|
| 2,267,965 | 12/1941 | Wilson | 260—309.6 |
| 2,468,180 | 4/1949 | De Groote et al. | 260—309.6 |
| 2,484,146 | 10/1949 | Barber et al. | 260—309.6 |
| 2,528,378 | 10/1950 | Mannheimer | 260—309.6 |
| 2,574,537 | 11/1951 | De Groote et al. | 260—309.6 |
| 3,138,473 | 6/1964 | Floyd et al. | 106—205 |

HENRY R. JILES, Primary Examiner

N. TROUSOF, Assistant Examiner

U.S. Cl. X.R.

117—138.5; 252—8.8, 351; 260—256.4, 307, 348, 404.5